(12) United States Patent
Salihbegovic

(10) Patent No.: US 11,643,910 B2
(45) Date of Patent: May 9, 2023

(54) GAS LIFT VALVE WITH TWO SIMULTANEOUS MECHANICAL STOPS

(71) Applicant: Zlatko Salihbegovic, New Iberia, LA (US)

(72) Inventor: Zlatko Salihbegovic, New Iberia, LA (US)

( * ) Notice: Subject to any disclaimer, the term of this patent is extended or adjusted under 35 U.S.C. 154(b) by 0 days.

(21) Appl. No.: 17/746,060

(22) Filed: May 17, 2022

(65) Prior Publication Data

US 2022/0307354 A1 Sep. 29, 2022

(51) Int. Cl.
*E21B 43/12* (2006.01)
*F16K 31/126* (2006.01)
*F16K 41/10* (2006.01)

(52) U.S. Cl.
CPC .......... *E21B 43/123* (2013.01); *F16K 31/126* (2013.01); *F16K 41/10* (2013.01); *Y10T 137/2934* (2015.04)

(58) Field of Classification Search
CPC ...... E21B 43/123; F16K 31/126; F16K 41/10; Y10T 137/2934
See application file for complete search history.

(56) References Cited

U.S. PATENT DOCUMENTS

| 11,242,732 | B2 * | 2/2022 | Salihbegovic | ........ E21B 43/123 |
| 2016/0145983 | A1 * | 5/2016 | Salihbegovic | ........ E21B 43/123 137/12 |

FOREIGN PATENT DOCUMENTS

GB 0134866 A2 * 12/1983 ............. F16K 31/50

* cited by examiner

*Primary Examiner* — George S Gray
(74) *Attorney, Agent, or Firm* — Ingenium Patents LLC; Peter R. Kramer

(57) ABSTRACT

A GLV-gas lift valve that employs TSMS-two simultaneous mechanical stops, first one when SEWB-single edge welded bellow 8 is fully compressed to solid by valve dome pressure 5 and second mechanical stop where adjustable sealing arrangement with compressible seal 25, threaded regulating nut 17 and threaded jam nut 18 are compressed against orifice 15, compressible seal 25 is fully compressed into groove 30, gap 26 is fully exhausted, dimension L reaches zero, and gap 31 is completely exhausted, providing second mechanical stop between TC ball 14 and orifice 15. Sealing arrangement can be TC-Tungsten carbide ball 14 butted against orifice 15, flat, conical or curved sealing surface containing said compressible seal, that is solidly compressed against SEWB or DEWB, thus providing second mechanical stop and sealing fluid flow through GLV. Compressing SEWB/DEWB to full solid protects bellow from high dome pressure 5 while "Fortress Seal™" per U.S. Pat. No. 11,424, 732 B2 protects bellow from high injection pressure.

4 Claims, 7 Drawing Sheets

GAS LIFT VALVE WITH TWO SIMULTANEOUS MECHANICAL STOPS

CROSS-REFERENCE TO RELATED APPLICATIONS

None

STATEMENT REGARDING FEDERALLY SPONSORED RESEARCH OR DEVELOPMENT

This patent application is not federally sponsored.

THE NAMES OF THE PARTIES TO A JOINT RESEARCH AGREEMENT

None

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None

STATEMENT REGARDING PRIOR DISCLOSURES BY THE INVENTOR OR A JOINT INVENTOR

None

BACKGROUND OF THE INVENTION (1) Field of the Invention

Oil and Gas Industry (2) Description of Related Art Including Information Disclosed Under 37 CFR 1.97 and 1.98

Not applicable

BRIEF SUMMARY OF THE INVENTION

A GLV-gas lift valve that employs TSMS-two simultaneous mechanical stops, first one when EWB-edge welded bellow is fully compressed to solid by valve dome pressure and second one where adjustable sealing arrangement with compressible seal is fully compressed against valve stem member sealing surface, that can be TC-Tungsten carbide ball, flat or curved sealing surface containing said compressible seal, that is solidly compressed against EWB subassembly, thus providing second mechanical stop and sealing fluid flow through GLV. Compressing EWB to full solid protects bellow from high dome pressure while "Fortress Seal™", per U.S. Pat. No. 11,424,732 B2 by author, protects bellow from high injection pressure.

BRIEF DESCRIPTION OF THE SEVERAL VIEWS OF THE DRAWING(S)

Figure 1:
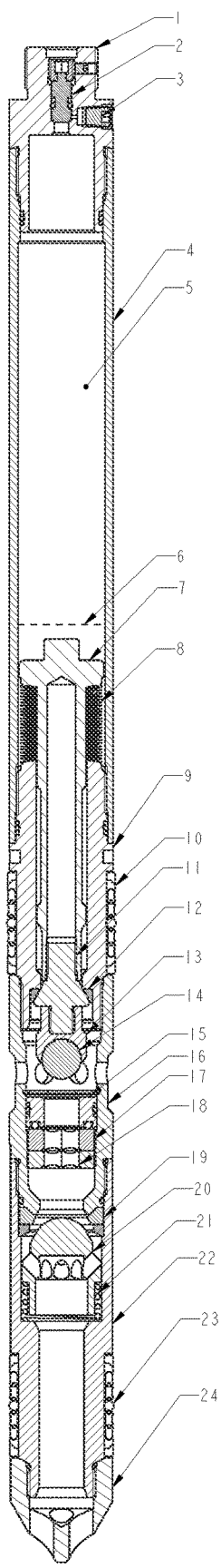
FIG. 1 shows gas lift valve with SEWB-single edge welded bellow that features TSMS-two simultaneous mechanical stops with adjustable sealing arrangement with TC-Tungsten carbide ball and incorporated check valve that prevents reversible flow.
Figure 3:
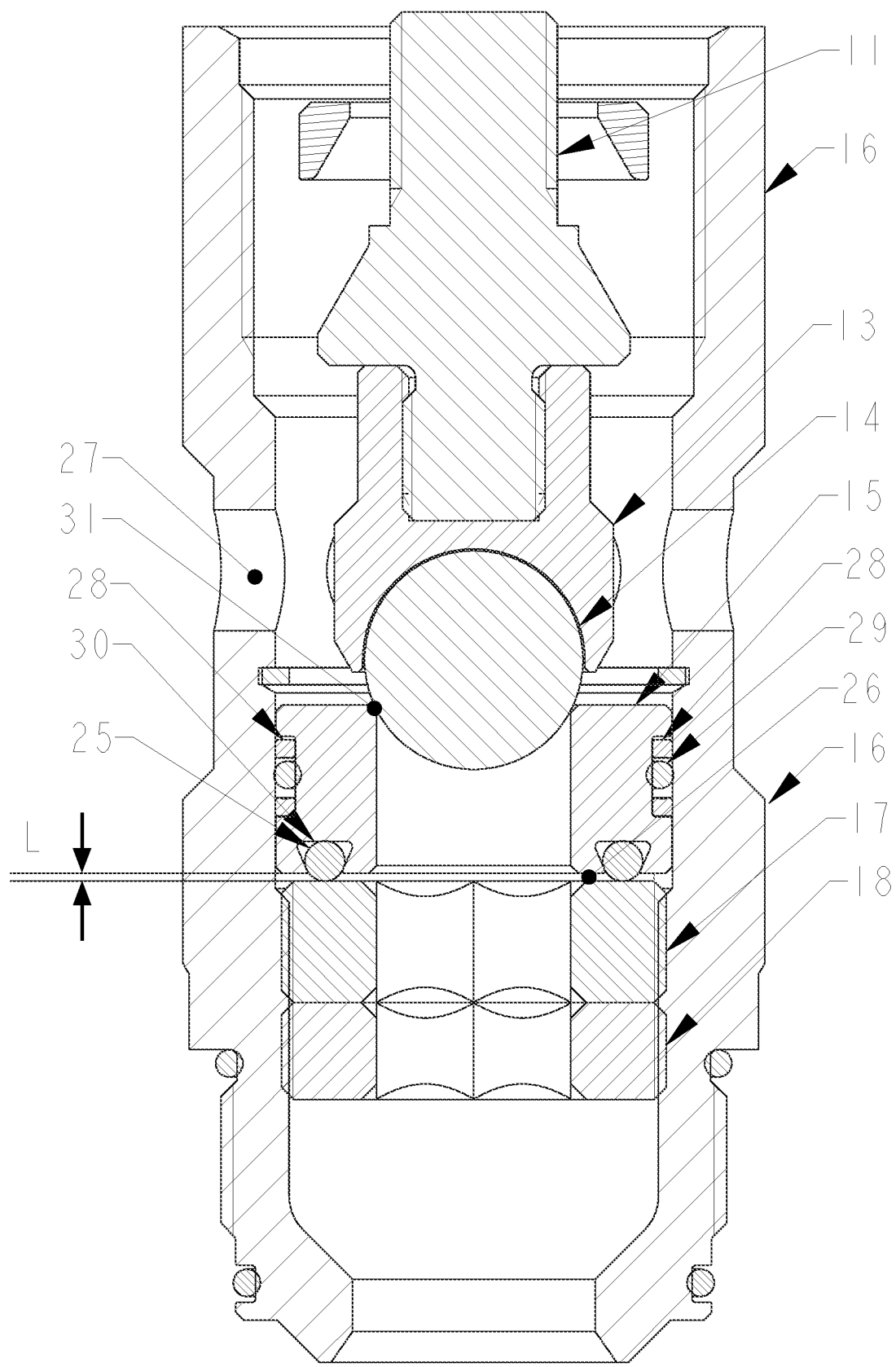

FIG. 3 shows enlarged detail of said valve from FIG. 1 without EWB in closed position where gap 31 is closed and adjustable sealing arrangement with compressible seal 25 that is not fully compressed against valve stem member sealing surface and existing gap 26 between orifice 17 and regulator nut 17 is not closed.

Figure 4:
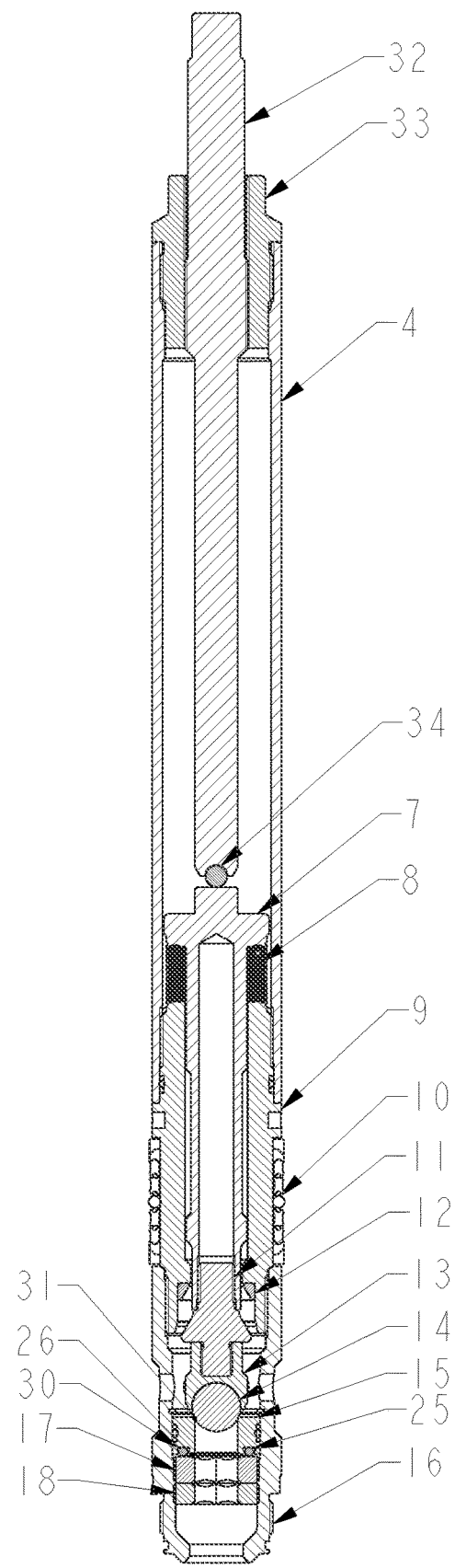

FIG. 4 shows GLV form FIG. 1 detail with bellow compression setting mechanism comprising threaded rod 32, guiding sleeve 33, TC ball 34 that prevents bellow torquing.

Figure 5:
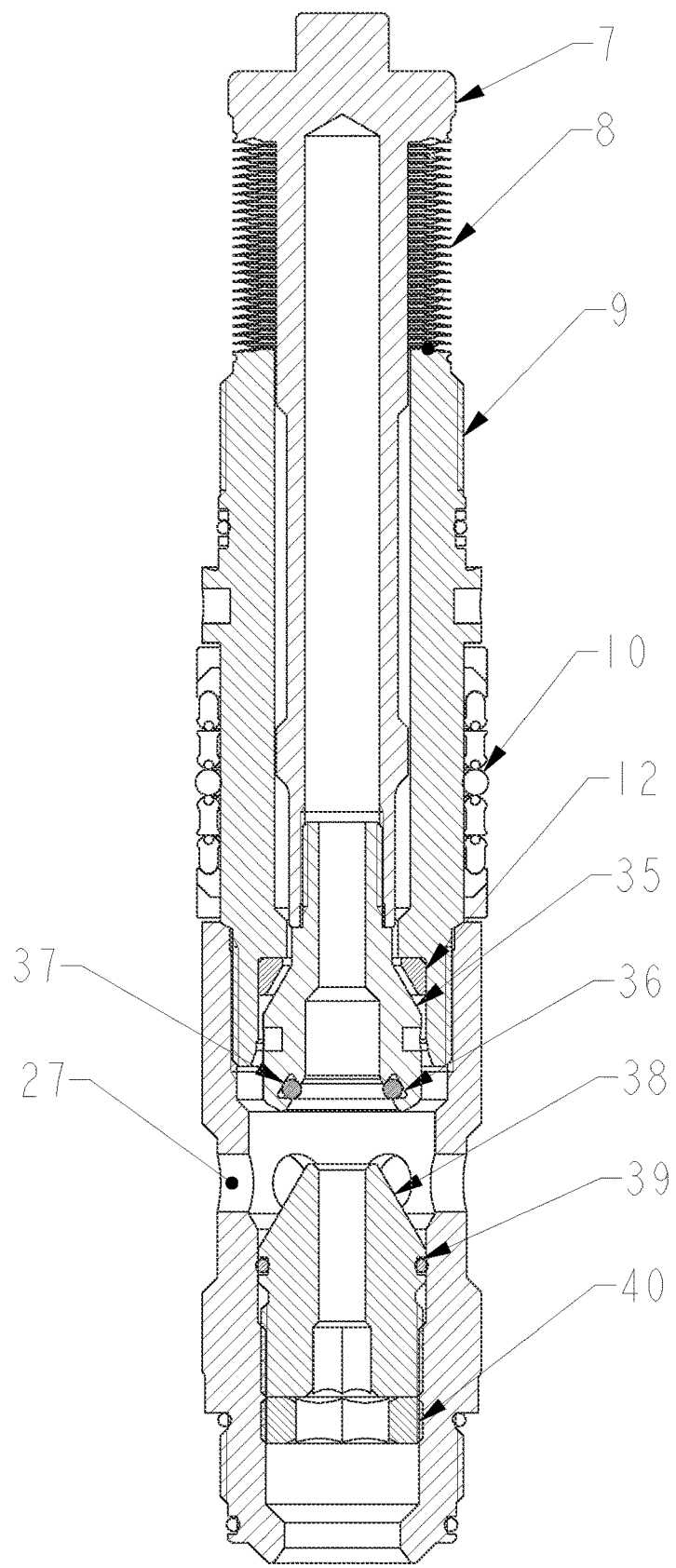

FIG. 5 shows yet another embodiment of GLV detail with valve in fully open position that employs conical sealing surfaces and EWB in fully expanded position.

Figure 6:
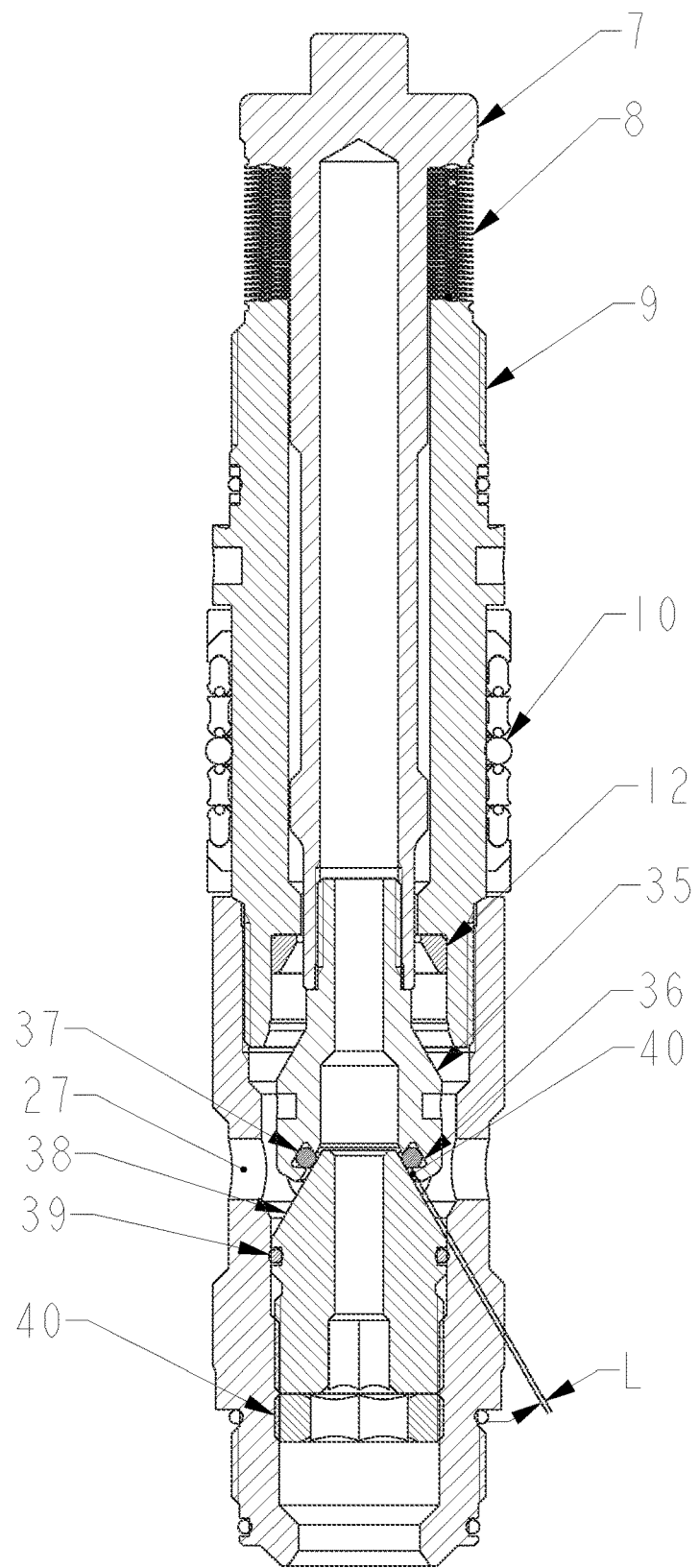

FIG. 6 shows GLV detail from FIG. 5 in fully closed position with compressible seal engaged-compressed and with gap 40 at distance L and bellow 8 fully compressed to solid.

Figure 7:
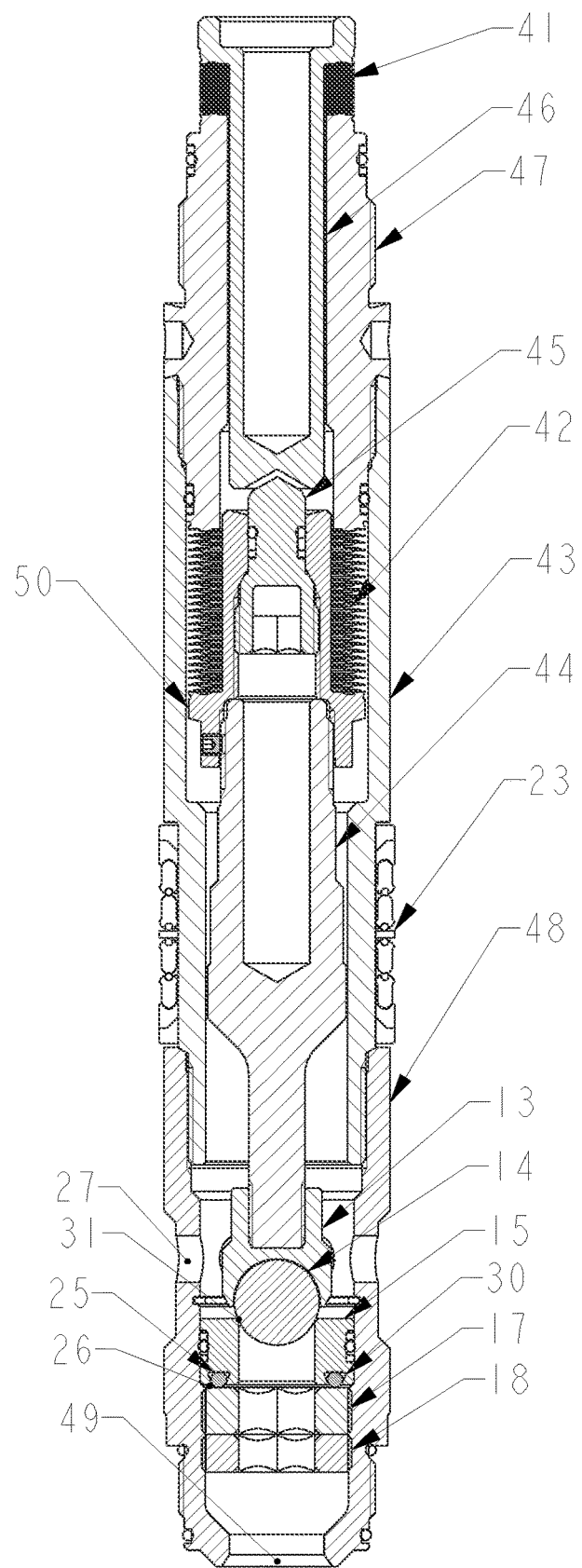

FIG. 7 shows yet another embodiment of said GLV from FIG. 1 employing DEWB-dual edge welded bellow arrangement and TC ball sealing arrangement.

DETAILED DESCRIPTION OF THE INVENTION

Figure 2:
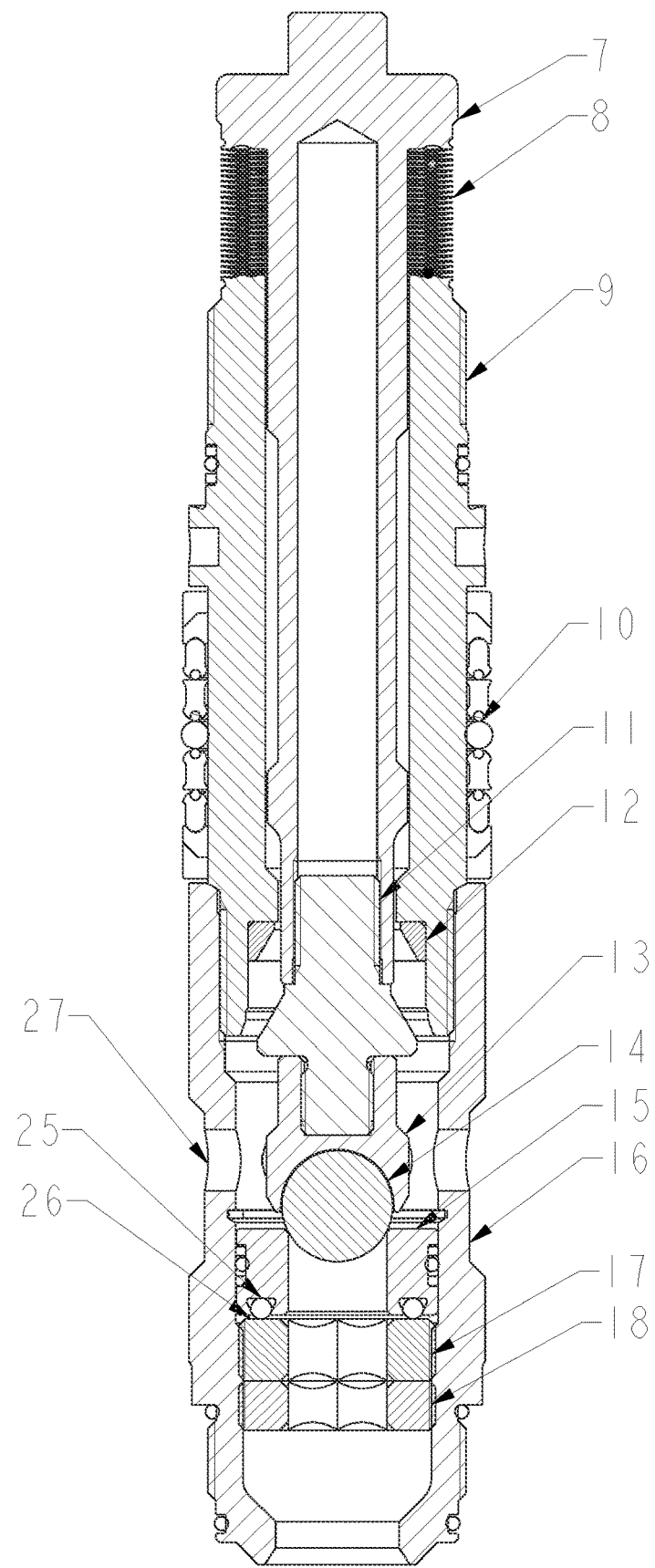
FIG. 2 shows said valve from FIG. 1 detail with EWB fully compressed to solid in closed position where adjustable sealing arrangement with compressible seal is not fully compressed against valve stem member sealing surface.

Gas lift valves are devices used in oil and gas industry to artificially lift oil from oil wells to the surface by injecting gas into oil formation and lift said oil to the surface where oil and gas are separated, and gas is re-used for repeated injection into oil formation. It is not intention of this patent application to explain gas lift techniques. Persons skilled in the art requires no further explanation of gas lift techniques. Gas lift valves are using said bellows as a sliding seal between dome Nitrogen pressure 5 and injection pressure 27. Dome Nitrogen pressure 5 is pre-set to desired value which determines valve opening pressure when injection pressure 27 is applied. Both standard convoluted bellows and EWB are not well suited for pressures higher than approximately 250 PSI. In gas lift valves bellows are exposed to injection pressures 27 sometimes higher than 5000 PSI. For this reason, bellows need to be protected from high injection 27 and high dome pressure 5. One of technique used today to protect bellow from high injection pressure is so called "bellow hydraulic protection" where non-compressible silicone oil 6 is trapped in volume between bellow 8 and dome housing 4 when valve is fully open. In existing gas lift valve designs internal seal engages (not shown here) and traps "non-compressible oil protecting bellow from over pressurizing. This technique has erroneous assumption that silicone oil is non-compressible. Pressurized Nitrogen 6 in valve dome housing 5 is always in direct contact with silicone oil 6 that is partially filled into dome volume 5 and penetrates to oil rendering it compressible because it is mixture of oil and Nitrogen. Nitrogen is permanent gas and stays gaseous no matter how high the pressure is. This method used for decades in gas lift is simply wrong. For further information check U.S. Pat. No. 11,424,732 B2 by the author. GLV shown in FIG. 1 uses silicone oil 6 only to prevent and reduce chatter that may occur due to specific flow condition Valve shown in FIG. 1 uses SEWB and valve shown in FIG. 7 uses DEWB. By design EWB when fully compressed to solid behave like piece of solid metal and can withstand huge external pressure in excess of 20KSI. EWB 8 features bellow segment geometry that allows full stack up of segments without gap between them. EWB segments are laser welded at OD-outside and ID-inside diameters. Weld thickness is equal or smaller than segment double thickness allowing full compression. Said valve form FIG. 1 employs SEWB 8 that is fully protected from high dome pressure 5 by going to full compression and by "Fortress seal" 12 from high injection pressure 27 when fully open. Two or more simultaneous mechanical stops can work only if and when one mechanical stop element slightly elastically deforms until second/next stop element fully engages. Bellow 8 compressed to solid is first mechanical stop. Second mechanical stop is provided by orifice 15 full contact with TC ball 14 where gap 31 is fully exhausted and by turning threaded regulator nut 17 until full contact with orifice 15 bottom is provided and gap 26 is fully exhausted. During this process compressible seal 25, shown in this embodiment as a dove tail O-Ring/groove is compressed into dove tail groove 30 tush providing sealing, see FIGS. 2 and 3 for details. Adjusting feature provided by regulating nut 17 and secured by threaded jam nut 18 of presented concept eliminates tolerance stuck up variations between machined components of the said valve/s. Compressible seal 25 travel from free standing shape to compressed shape eliminates first mechanical stops possible elastic deformations until second mechanical stop is engaged. Depending on compressible seal 25 stiffness force and friction force of backup rings 28 and O-Ring 29 orifice 15 may or may not slightly travel upwards if stiffness force is larger than friction force when valve opens and TC ball 14 travels upwards to open position. This orifice 15 travel upwards stops as soon as equilibrium of these two forces is reached. Once bellow 8 is fully compressed orifice 15 will be pushed solid against regulator nut 17 and gap 26 will be completely exhausted. This behavior is completely acceptable and will not in any way affect valve performance.

Another embodiment of presented concept shown in FIGS. 5 and 6 is utilizing conical sealing surfaces with dove tail O-Ring groove 36 and O-Ring 37. In this concept bellow 8 is compressed either using threaded rod 32, guide sleeve 33 and TC ball 34 or simply applying dome pressure 5 to fully compress the bellow 8. Regulating conical nut 38 is tightened against stem 35 with bellow 8 in fully compressed position until gap 40 is fully exhausted and compressible seal, in this embodiment shown as dove tail O-Ring is compressed into groove.

TSMS principle can be used in any other application, which is not shown here, not only in GLV, wherein SEWB or DEWB is used allowing bellow/s to go to full compression to solid creating first mechanical stop, where execution end shown in GLV as TC ball or conical surface can be of different shape/functionality creating second mechanical stop. One of application can be hydraulic/pneumatic actuator using EWB/s.

I have provided a gas lift valve shown on FIG. 1 for use in onshore and offshore oil wells for oil artificial lifting to the surface comprising major parts as an external structure with longitudinal axis with dome housing 4, upper packing-seal stack body 9 with upper packing stack-seal 10, inlet pressure sub 16, orifice 15, lower packing-seal stack body 22 with lower packing-seal stack 23, nose 24 and internal moveable valve structure comprising edge welded bellow 8, bellow guide 7, "Fortress seal™" 12, upper stem 11, ball housing 13, TC-Tungsten carbide ball 14, threaded regulator nut 17, threaded jam nut 18, compressible seal 25, and reverse flow check valve dart 20 with seal 19. Valve further features dome pressure 5 wherein dome pressure acts against bellow 8 external surface compressing it and injection pressure 27 that acts against bellow 8 internal surface expanding it.

I have provided a gas lift valve wherein valve opens when injection pressure 27 acting inside bellow 8 generates force that exceeds dome pressure 5 acting outside bellow 8 generated force mowing TC ball 14 of the orifice 15, and valve closes when dome pressure 5 generated force is larger than injection pressure 26 generated force and TC ball travels toward orifice 15 until valve closes and gap 31 is completely eliminated.

I have provided a gas lift valve wherein first mechanical stop is located at completely compressed EWB 8 to solid and second mechanical stop is located at interface of TC ball 14 and orifice 15 once regulating procedure is implemented per the setting procedure below, gap 31 is completely exhausted and regulating nut 17 is compressed against bottom of orifice 15 that slide upwards toward bottom of orifice 15, gap 26 is completely exhausted, dimension L reaches zero length, thus compressing compressible seal 25 fully into the groove 30 shown in this embodiment as dove tail O-ring groove. Complete subassembly comprising of bellow 8, bellow guide 7, upper stem 11, ball housing 13, TC ball 14, orifice 15, threaded regulating nut 17 and threaded jam nut 18 is now rendered solid held by compressible seal 25 compressing force.

I have provided a gas lift valve where setting procedure is implemented and EWB 8 is compressed to solid by turning threaded rod 32 in guide sleeve 33 compressing bellow 8 to solid where lubricated TC ball 34 is used to prevent torque against bellow. When bellow 8 is compressed to solid threaded regulator nut 17 with internal hex is compressed by turning against orifice 15 until lubricated compressible seal 25 is compressed into groove 30 and gap 26 is exhausted and dimension L reaches zero value. Appropriate torque applied to threaded regulating nut 17 is required to completely eliminate gap 26 and compress compressible seal 25 into groove 30.

I have provided a gas lift valve wherein bellow 8 can be compressed to solid by applying dome pressure 5 instead of using threaded rod 32 and rest of setting procedure is the same as the above setting procedure. However, this procedure involves working with pressurized dome 4 and procedure above is safer.

I have provided a gas lift valve wherein possibility to adjust gap 26 and length L to zero for every individual set of valve machined parts completely eliminates tolerance stack-up variability for each set of machined parts that are always made to different dimensional values but within acceptable tolerances and as such are machined correctly.

I have provided a gas lift valve wherein instead of compressible seal 25 one or multiple Belville washers or spring (not shown) can be used between orifice 15 and threaded regulating nut 17 to provide compressibility.

I have provided another embodiment of gas lift valve, shown on FIGS. 5 and 6, wherein compressible seal 37 can be arranged in conical sealing surface of conical stem 35 wherein conical threaded regulating nut 38 is abutted against conical threaded regulating nut 38 wherein gap 40 is exhausted, dimension L reaches zero length and thus provides sealing and closes valve for flow. FIG. 5 shows valve in open position with bellow 8 expanded and FIG. 6 shows valve with compressible seal 37 is initially engaged.

I have provided another embodiment of gas lift valve that can be arranged with DEWB-dual edge welded bellow shown on FIG. 7, with upper bellow 41, lower bellow 42 arrangement with exactly the same functionality as described for valves with SEWB.

I have provided a gas lift valve wherein the TSMS principle described in this patent application can be used in any other application, which is not shown here, not only in GLV, wherein SEWB or DEWB is used allowing bellow/s to go to full compression to solid creating first mechanical stop, where execution end shown in GLV as TC ball 14 or conical surface 38 can be of different shape/functionality creating second mechanical stop.

I have provided a gas lift valve comprising an external structure having a longitudinal axis and a dome housing 4, an upper packing seal stack body 9, slidably positioned within the dome housing, the upper packing seal stack body 9 having an upper packing seal stack 10, positioned between the upper packing seal stack body and the dome housing, an inlet pressure sub 16 coupled to the upper packing seal stack body, a seat 15, positioned within the inlet pressure sub 16, a lower packing seal stack body 22, coupled to the inlet pressure sub 16, having a lower packing seal stack 23, a nose 24, coupled to the lower packing seal stack body, and an internal moveable valve structure comprising an edge welded bellow 8 (EWB), positioned between the upper packing seal stack body and a bellow guide 7, an upper stem 11, a seal 12 for sealing the upper stem 11 against an interior shoulder of the upper packing seal stack body, a ball housing 13, coupled to the upper stem 11, a tungsten carbide (TC) ball 14, coupled to the ball housing 13 and downwardly movable for seating in the seat 15, a hex threaded regulator nut 17 threadably coupled to an interior surface of the inlet pressure sub 16, a hex threaded jam nut 18 positioned against a lower end of the hex threaded regulator nut 17 and threadably coupled to an interior surface of the inlet pressure sub 16, a lubricated compressible seal 25 positioned on a downwardly facing lower end surface of the seat 15, and a reverse flow check valve dart 20, the reverse flow check valve dart positioned within the lower packing seal stack body for upwardly seating against a seal 19; the gas lift valve having dome pressure 5 acting against the EWB 8 external surface, thus compressing the EWB 8; the gas lift valve further having an injection pressure 27 entering through the inlet pressure sub 16 and acting against an EWB 8 internal surface, thus expanding the EWB 8; wherein the gas lift valve opens when the injection pressure 27 acting on the internal surface of EWB 8 generates a first force that exceeds the dome pressure 5 acting against the external surface of the EWB 8, generating a second force moving the TC ball 14 off the seat 15, and the gas lift valve closes when the dome pressure 5 generates a third force that is larger than the injection pressure 27 generated first force, such that the TC ball 14 travels toward the seat 15 until the gas lift valve closes and a gap 31 between the TC ball 14 and the seat 15 is completely eliminated; and further wherein a setting procedure is implemented and further wherein the EWB 8 is compressed to solid by turning a threaded rod 32 in a guide sleeve 33, the guide sleeve 33 positioned proximate the upper end of the dome housing 4, the threaded rod 32 being coupled to the bellow guide 7, thus compressing the EWB 8 to solid, and further wherein a lubricated second TC ball 34, positioned between the threaded rod 32 and the bellow guide 7, the second TC ball 34 being used to prevent torque against the EWB 8; and further such that, when the EWB 8 is thus compressed to solid, the threaded regulator nut 17 is compressed against the orifice 15 by turning the threaded regulator nut 17, using a torque applied against said threaded regulator nut 17, until the lubricated compressible seal 25 is compressed into a groove 30, such that a gap 26, between the orifice 15 and the threaded regulator nut 17, is eliminated, the gap 26 having a pre-compression spacing L, the pre-compression spacing L reaching zero value after said compression, said torque being required to completely eliminate the gap 26 and compress the lubricated compressible seal 25 into the groove 30.

I have provided a gas lift valve wherein after the completion of the setting procedure, the completely compressed to solid EWB 8 provides a first mechanical stop at the interface of the threaded regulator nut 17 and the seat 15, and further provides a second mechanical stop located at the interface of the TC ball 14 and the seat 15, such that the gas lift valve is rendered a solid.

I have provided a gas lift valve wherein the compressible seal 25 is one of an O-ring, a Belleville spring, or a Belleville washer.

I have provided a gas lift valve wherein the EWB 8 is one of a single edge welded bellow or a dual edge welded bellow, the dual edge welded bellow having an upper bellow 41 and a lower bellow 42.

The invention claimed is:

1. A gas lift valve comprising an external structure having a longitudinal axis and a dome housing 4, an upper packing seal stack body 9, slidably positioned within the dome housing, the upper packing seal stack body 9 having an upper packing seal stack 10, positioned between the upper packing seal stack body and the dome housing, an inlet pressure sub 16 coupled to the upper packing seal stack body, a seat 15, positioned within the inlet pressure sub 16, a lower packing seal stack body 22, coupled to the inlet pressure sub 16, having a lower packing seal stack 23, a nose 24, coupled to the lower packing seal stack body, and an internal moveable valve structure comprising an edge welded bellow 8 (EWB), positioned between the upper packing seal stack body and a bellow guide 7, an upper stem 11, a seal 12 for sealing the upper stem 11 against an interior shoulder of the upper packing seal stack body, a ball housing 13, coupled to the upper stem 11, a tungsten carbide (TC) ball 14, coupled to the ball housing 13 and downwardly movable for seating in the seat 15, a hex threaded regulator nut 17 threadably coupled to an interior surface of the inlet pressure sub 16, a hex threaded jam nut 18 positioned against a lower end of the hex threaded regulator nut 17 and threadably coupled to an interior surface of the inlet pressure sub 16, a lubricated compressible seal 25 positioned on a downwardly facing lower end surface of the seat 15, and a reverse flow check valve dart 20, the reverse flow check valve dart positioned within the lower packing seal stack body for upwardly seating against a seal 19; the gas lift valve having dome pressure 5 acting against the EWB 8 external surface, thus compressing the EWB 8; the gas lift valve further having an injection pressure 27 entering through the inlet pressure sub 16 and acting against an EWB 8 internal surface, thus expanding the EWB 8;

wherein the gas lift valve opens when the injection pressure 27 acting on the internal surface of EWB 8 generates a first force that exceeds the dome pressure 5 acting against the external surface of the EWB 8, generating a second force moving the TC ball 14 off the seat 15, and the gas lift valve closes when the dome pressure 5 generates a third force that is larger than the injection pressure 27 generated first force, such that the TC ball 14 travels toward the seat 15 until the gas lift valve closes and a gap 31 between the TC ball 14 and the seat 15 is completely eliminated;

and further wherein a setting procedure is implemented and further wherein the EWB 8 is compressed to solid by turning a threaded rod 32 in a guide sleeve 33, the guide sleeve 33 positioned proximate the upper end of the dome housing 4, the threaded rod 32 being coupled to the bellow guide 7, thus compressing the EWB 8 to solid, and further wherein a lubricated second TC ball 34, positioned between the threaded rod 32 and the bellow guide 7, the second TC ball 34 being used to prevent torque against the EWB 8; and further such that, when the EWB 8 is thus compressed to solid, the threaded regulator nut 17 is compressed against the orifice 15 by turning the threaded regulator nut 17, using a torque applied against said threaded regulator nut 17, until the lubricated compressible seal 25 is compressed into a groove 30, such that a gap 26, between the orifice 15 and the threaded regulator nut 17, is eliminated, the gap 26 having a pre-compression spacing L, the pre-compression spacing L reaching zero value after said compression, said torque being required to completely eliminate the gap 26 and compress the lubricated compressible seal 25 into the groove 30.

2. The gas lift valve of claim 1, wherein after the completion of the setting procedure, the completely compressed to solid EWB 8 provides a first mechanical stop at the interface of the threaded regulator nut 17 and the seat 15, and further provides a second mechanical stop located at the interface of the TC ball 14 and the seat 15, such that the gas lift valve is rendered a solid.

3. The gas lift valve of claim 1 wherein, the compressible seal 25 is one of an O-ring, a Belleville spring, or a Belleville washer.

4. The gas lift valve of claim 1, wherein the EWB 8 is one of a single edge welded bellow or a dual edge welded bellow, the dual edge welded bellow having an upper bellow 41 and a lower bellow 42.

* * * * *